(12) United States Patent
Ray et al.

(10) Patent No.: US 12,025,982 B2
(45) Date of Patent: Jul. 2, 2024

(54) MULTIPLE ANGLED FIELD-OF-VIEW CLOUD SENSOR

(71) Applicant: Rosemount Aerospace Inc., Burnsville, MN (US)

(72) Inventors: Mark Ray, Burnsville, MN (US); Kent Allan Ramthun, Shakopee, MN (US); Kaare Josef Anderson, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 415 days.

(21) Appl. No.: 17/503,731

(22) Filed: Oct. 18, 2021

(65) Prior Publication Data

US 2023/0120329 A1    Apr. 20, 2023

(51) Int. Cl.
*G05D 1/00* (2024.01)
*G02B 30/25* (2020.01)
*G06V 20/17* (2022.01)

(52) U.S. Cl.
CPC ........... *G05D 1/0094* (2013.01); *G02B 30/25* (2020.01); *G06V 20/17* (2022.01)

(58) Field of Classification Search
CPC .... G05D 1/0094; G06K 9/0063; G02B 30/25; B64D 15/20; B64D 45/00; G01S 17/95; G01S 17/10; G01S 7/4865; G01S 7/4802; G01N 15/0211; G01N 21/3577; G01N 21/4738; G01N 15/0205; G01N 15/06;
(Continued)

(56) References Cited

U.S. PATENT DOCUMENTS

| 4,327,286 A | 4/1982 | Thoma |
| 5,748,091 A | 5/1998 | Kim |

(Continued)

FOREIGN PATENT DOCUMENTS

| EP | 3351967 A2 | 7/2018 |
| EP | 3783333 A1 | 2/2021 |

(Continued)

OTHER PUBLICATIONS

Gueymard, C. A., "Spectral Circumsolar Radiation Contribution To CPV", CPV-6 Conf., Freiburg, Germany, Apr. 2010, 5 pages.

(Continued)

*Primary Examiner* — Hoa Q Pham
(74) *Attorney, Agent, or Firm* — Kinney & Lange, P.A.

(57) ABSTRACT

An optical sensor for an aircraft includes two detectors, a light source, and a controller. The detectors are oriented along detector paths and have tilt angles and fields of view. The detectors are configured to detect light reflected from an illumination volume and to generate detector signals that correspond to intensities of detected light. The tilt angles are equal such that each detector is oriented in an opposite direction within a plane containing a light source path and the detector paths. The light source is oriented along the light source path and is configured to illuminate the illumination volume which overlaps with the fields of view within a predetermined distance range. The controller is configured to receive the detector signals, detect whether a cloud is present based upon the detector signals, determine a cloud phase, and calculate a density of the detected cloud.

12 Claims, 6 Drawing Sheets

(58) Field of Classification Search
CPC ........... G01N 15/02; G01N 2015/0277; G01N 2015/0693; G08G 5/0091; G01W 1/00
USPC ......... 356/335–343; 73/25.05, 170.26, 31.05
See application file for complete search history.

(56) References Cited

U.S. PATENT DOCUMENTS

| | | | | |
|---|---|---|---|---|
| 5,751,423 | A * | 5/1998 | Traina | G01N 15/0205 250/576 |
| 6,069,565 | A | 5/2000 | Stern et al. | |
| 6,091,335 | A | 7/2000 | Breda et al. | |
| 6,302,355 | B1 | 10/2001 | Sallee et al. | |
| 6,819,265 | B2 | 11/2004 | Jamieson et al. | |
| 6,914,674 | B1 | 7/2005 | Wang | |
| 7,104,502 | B2 | 9/2006 | Otto et al. | |
| 7,312,713 | B2 | 12/2007 | Alfano et al. | |
| 7,370,525 | B1 | 5/2008 | Zhao et al. | |
| 7,485,862 | B2 | 2/2009 | Danziger | |
| 7,986,408 | B2 | 7/2011 | Ray et al. | |
| 8,831,884 | B2 | 9/2014 | Ray et al. | |
| 9,116,243 | B1 | 8/2015 | Brown | |
| 9,588,220 | B2 | 3/2017 | Rondeau et al. | |
| 9,690,008 | B2 | 6/2017 | Antikainen et al. | |
| 9,983,112 | B1 * | 5/2018 | Ray | G01S 7/4818 |
| 10,207,810 | B2 | 2/2019 | Anderson et al. | |
| 10,429,511 | B2 | 10/2019 | Bosetti et al. | |
| 10,444,368 | B2 | 10/2019 | Ray et al. | |
| 10,620,342 | B2 | 4/2020 | Essawy et al. | |
| 10,640,218 | B2 | 5/2020 | Baudouin et al. | |
| 10,816,661 | B2 | 10/2020 | Ray et al. | |
| 11,137,519 | B2 | 10/2021 | Ray et al. | |
| 11,630,215 | B2 * | 4/2023 | Huynh | G01S 17/10 356/5.01 |
| 11,686,742 | B2 | 6/2023 | Naslund et al. | |
| 11,827,365 | B2 * | 11/2023 | Anderson | G01S 17/95 |
| 2002/0075472 | A1 | 6/2002 | Holton | |
| 2003/0232445 | A1 | 12/2003 | Fulghum | |
| 2006/0126055 | A1 | 6/2006 | Meneely et al. | |
| 2009/0128798 | A1 | 5/2009 | Danziger | |
| 2009/0219523 | A1 | 9/2009 | Morris et al. | |
| 2010/0110431 | A1 | 5/2010 | Ray et al. | |
| 2011/0019188 | A1 | 1/2011 | Ray et al. | |
| 2011/0181881 | A1 | 7/2011 | Mathur et al. | |
| 2013/0103317 | A1 | 4/2013 | Ray et al. | |
| 2013/0162974 | A1 | 6/2013 | Dakin et al. | |
| 2015/0051498 | A1 | 2/2015 | Darty | |
| 2015/0070700 | A1 | 3/2015 | Ray et al. | |
| 2015/0116692 | A1 | 4/2015 | Zuk et al. | |
| 2017/0268993 | A1 | 9/2017 | Anderson et al. | |
| 2017/0276790 | A1 | 9/2017 | Lodden et al. | |
| 2017/0328833 | A1 | 11/2017 | Mamidipudi et al. | |
| 2017/0356997 | A1 * | 12/2017 | Ray | G01S 7/025 |
| 2018/0024270 | A1 | 1/2018 | Ray et al. | |
| 2018/0052237 | A1 | 2/2018 | Ray et al. | |
| 2018/0209887 | A1 | 7/2018 | Ray et al. | |
| 2019/0140745 | A1 | 5/2019 | Sprague et al. | |
| 2019/0383735 | A1 | 12/2019 | Ray et al. | |
| 2021/0011138 | A1 | 1/2021 | Pan et al. | |
| 2021/0055422 | A1 | 2/2021 | Ray et al. | |
| 2021/0172851 | A1 | 6/2021 | Lincoln et al. | |
| 2021/0293659 | A1 | 9/2021 | Ray et al. | |
| 2023/0081599 | A1 | 3/2023 | Ray | |

FOREIGN PATENT DOCUMENTS

| | | |
|---|---|---|
| GB | 2511344 A | 9/2014 |
| WO | 2012105973 A1 | 8/2012 |

OTHER PUBLICATIONS

Communication pursuant to Article 94(3) EPC for EP Application No. 21150769.4, dated Sep. 14, 2023, 4 pages.
Extended European Search Report from EP Application No. 21150769.4, Dated Jul. 14, 2021, 11 pages.
M. Schnaiter, et al., "Influence of particle size and shape on the backscattering linear depolarisation ratio of small ice crystals—cloud chamber measurements in the context of contrail and cirrus microphysics", from Atoms. Chem. Phys. 12 (2012) 20 pages.
Extended European Search Report for EP Application No. 22201347.6, dated Feb. 27, 2023, 11 pages.
K.J. Anderson, et al., "SLD and Ice Crystal Discrimination with the Optical Ice Detector", from SAE Technical Paper 2019-01-1934, 2019, doI: 10.4271/2019-01-1934, Jun. 19, 2019, 10 pages.
Extended European Search Report for EP Application No. 22200843.5, dated Mar. 22, 2023, 8 pages.
M. D. Ray, et al., "Optical Detection of Airborne Ice Crystals and Liquid Water Droplets", from 1st AIAA Atmospheric and Space Environments Conference, Jun. 22-25, 2009, 15 pages.

* cited by examiner

MULTIPLE ANGLED FIELD-OF-VIEW CLOUD SENSOR

BACKGROUND

The present disclosure relates generally to optical sensors, and in particular to a cloud sensor for an aircraft.

It is desirable to enable an optical sensor to detect potential icing conditions from clouds while reducing interference from ambient light. However, some icing condition detection methods rely on short pulse width lasers, and these methods require high-speed, sensitive electronics to detect the cloud reflection signals generated by the short pulse width lasers.

SUMMARY

According to one aspect of the present invention, an optical sensor for an aircraft includes a first detector, a second detector, a light source, and a controller. The first detector is oriented along a first detector path and has a first tilt angle and a first detector field of view. The first detector is configured to detect light reflected from an illumination volume and to generate a first detector signal that corresponds to a first intensity of detected light. The second detector is oriented along a second detector path and has a second tilt angle and a second detector field of view. The second tilt angle is equal to the first tilt angle such that the second detector is oriented in an opposite direction as the first detector within a plane containing a light source path, the first detector path, and the second detector path. The second detector is configured to detect light reflected from an illumination volume and to generate a second detector signal that corresponds to a second intensity of detected light. The light source is oriented along the light source path. The light source is configured to illuminate the illumination volume which overlaps with both the first detector field of view and the second detector field of view within a predetermined distance range. The predetermined distance range extends between a maximum distance from the first detector and the second detector and a minimum distance from the first detector and the second detector. The controller is configured to receive the first detector signal and the second detector signal. The controller is further configured to detect whether a cloud is present based upon the first detector signal and the second detector signal. The controller is further configured to determine, if a cloud is detected, a cloud phase of the cloud. The controller is further configured to estimate, if a cloud is detected, a density of the cloud.

According to another aspect of the present invention, a method of operating an optical sensor for an aircraft includes emitting, with a light source oriented along a light source path, a light beam with a wavelength and thereby illuminating an illumination volume. A first detector receives light having the wavelength and thereby generates a first detector signal that corresponds to a first intensity of detected light. The first detector is oriented along a first detector path and has a first tilt angle and a first detector field of view. A second detector receives light having the wavelength and thereby generating a second detector signal that corresponds to a second intensity of detected light. The second detector is oriented along a second detector path and has a second tilt angle and a second detector field of view. The second tilt angle is equal to the first tilt angle such that the second detector is oriented in an opposite direction as the first detector within a plane containing the light source path, the first detector path, and the second detector path. A controller receives the first detector signal and the second detector signal. The controller detects whether a cloud is present using at least one of the first detector signal and the second detector signal. The controller determines a cloud phase of the cloud if a cloud is detected. The controller calculates a density of the cloud if a cloud is detected. The light source is configured to illuminate an illumination volume which overlaps with both the first detector field of view and the second detector field of view within a predetermined distance range. The predetermined distance range extends between a maximum distance from the first detector and the second detector and a minimum distance from the first detector and the second detector.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way.

DETAILED DESCRIPTION

Two or more independent detectors with complementary tilt angles can be used to avoid interference with an optical sensor due to direct solar viewing and/or scattered sunlight within the solar aureole. A quad detector photodiode and various detector masks can be used to compensate for constraints on tilt angle ranges by allowing for cloud detection and/or cloud phase discrimination while still preventing simultaneous solar interference.

Figure 1:
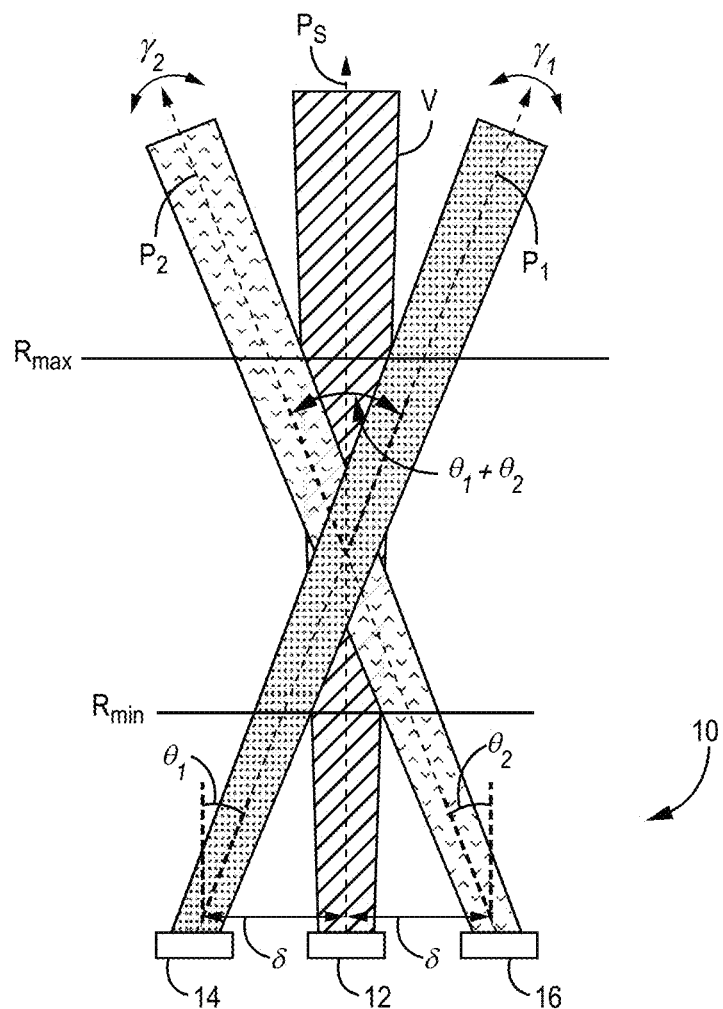
FIG. 1 is a schematic depiction of an optical sensor with dual detectors.

FIG. 1 is a schematic depiction of optical sensor 10. Optical sensor 10 includes source 12, first detector 14, and second detector 16. Optical sensor 10 can additionally include a controller, such as controller 100 (shown in FIG. 2).

Source 12 can be an optical transmitter which is configured to emit light at a wavelength. In some examples, source 12 can be a laser source. First detector 14 and second detector 16 can be optical detectors which are configured to receive light at the wavelength emitted by source 12. First detector 14 and second detector 16 can be further configured to generate detector signals based upon the intensity of light received by either first detector 14 or second detector 16. For example, first detector 14 can be configured to generate a first detector signal that corresponds to a first intensity of detected light that first detector 14 receives, and second detector 16 can be configured to generate a second detector signal that corresponds to a second intensity of detected light that second detector 16 receives. First detector 14 and second detector 16 can be located within optical sensor 10 on either side of source 12. First detector 14 and second detector 16 can each be located a separation distance δ from source 12.

Source 12 is oriented along source path $P_s$ such that source 12 emits a light beam at the wavelength along source path $P_s$ during operation. Source path $P_s$ is a light source path. First detector 14 is oriented along first detector path $P_1$ such that first detector 14 receives light at the wavelength along first detector path $P_1$ during operation. First detector 14 receives light at tilt angle $\theta_1$. Similarly, second detector 16 is oriented along second detector path $P_2$ such that second detector 16 receives light at the wavelength along second detector path $P_2$ during operation. Second detector 16 receives light at tilt angle $\theta_2$. First detector 14 and second detector 16 can receive light at approximately equivalent tilt angles $\theta_1$, $\theta_2$ on either side of source 12.

During operating, the light emitted by source 12 illuminates illumination volume V. First detector 14 has first detector field of view $\gamma_1$, and first detector 14 is configured to receive light having the wavelength over first detector field of view $\gamma_1$ during operation. Second detector 16 has second detector field of view $\gamma_2$, and second detector 16 is configured to receive light having the wavelength over second detector field of view $\gamma_2$ during operation. First detector field of view $\gamma_1$ can be equal in magnitude to second detector field of view $\gamma_2$. First detector path $P_1$ and second detector path $P_2$ are the central axes of the fields of view of first detector 14 and second detector 16, respectively. First detector path $P_1$ and second detector path $P_2$ are within the same plane as source path $P_s$. Optical sensor 10 is configured such that illumination volume V overlaps with first detector field of view $\gamma_1$ and second detector field of view $\gamma_2$ over a predetermined distance range. The predetermined distance range is the distance between a minimum distance and a maximum distance $R_{max}$. $R_{min}$ is the distance from source 12 at which illumination volume V begins to overlap with first detector field of view $\gamma_1$ and second detector field of view $\gamma_2$. $R_{max}$ is the distance from source 12 at which illumination volume V ceases to overlap with first detector field of view $\gamma_1$ and second detector field of view $\gamma_2$. These overlaps allow first detector 14 and second detector 16 to receive light from source 12 while avoiding simultaneous solar interference with first detector 14 and second detector 16.

The sun subtends an angle of 0.5 degrees in the sky. The tilt angles $\theta_1$, $\theta_2$ needed to avoid direct solar viewing by both first detector 14 and second detector 16 simultaneously can be found as shown below:

$$(\theta_1+\theta_2)-\gamma>0.5°$$

where γ is first detector field of view $\gamma_1$ or second detector field of view $\gamma_2$. When tilt angles $\theta_1$, $\theta_2$ are equal in magnitude, this equation becomes:

$$2\theta-\gamma>0.5°$$

Figure 2:
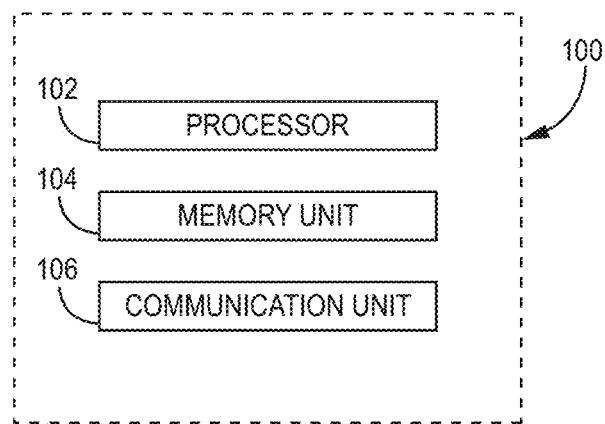
FIG. 2 is a schematic depiction of a controller.

FIG. 2 is a schematic depiction of controller 100. Controller 100 can include processor 102, memory unit 104, and communication unit 106. In some embodiments, controller 100 can include multiple processors 102, memory units 104, and communication units 106. Controller 100 can additionally include more components, such as an input device, an output device, and/or a power source.

Processor 102 can be configured to implement functionality and/or process instructions for execution within controller 100. For example, processor 102 can be capable of processing instructions stored in memory unit 104. Examples of processor 102 can include any one or more of a microprocessor, a controller, a digital signal processor (DSP), an application specific integrated circuit (ASIC), a field-programmable gate array (FPGA), or other equivalent discrete or integrated logic circuitry. Instructions executed by processor 102 can cause controller 100 to perform actions, such as using detector signals from first detector 14 and/or second detector 16 to determine if a cloud is present, determining the cloud phase of the detected cloud, and calculating a density of the detected cloud.

Controller 100 can also include memory capable of storage, such as memory unit 104. Memory unit 104 can be configured to store information (and/or instructions which may be executable by processor 102) within controller 100 during operation. Memory unit 104, in some examples, is described as a computer-readable storage medium. In some examples, a computer-readable storage medium can include a non-transitory medium. The term "nontransitory" can indicate that the storage medium is not embodied in a carrier wave or a propagated signal. In certain examples, a non-transitory storage medium can store data that can, over time, change (e.g., in RAM or cache). In some examples, memory unit 104 is a temporary memory, meaning that a primary purpose of memory unit 104 is not long-term storage. Memory unit 104, in some examples, is described as volatile memory, meaning that memory unit 104 does not maintain stored contents when power to controller 100 is turned off. Examples of volatile memories can include random access memories (RAM), dynamic random access memories (DRAM), static random access memories (SRAM), and other forms of volatile memories. In some examples, memory unit 104 is used to store program instructions for execution by processor 102.

Memory unit 104 can be configured to store larger amounts of information than volatile memory. Memory unit 104 can further be configured for long-term storage of information. In some examples, memory unit 104 includes non-volatile storage elements. Examples of such nonvolatile storage elements can include magnetic hard discs, optical discs, flash memories, or forms of electrically programmable memories (EPROM) or electrically erasable and programmable (EEPROM) memories.

Controller 100 can also include communication unit 106. Controller 100 can utilize communication unit 106 to communicate with devices via one or more networks, such as one or more wireless or wired networks or both. Communication unit 106 can be a network interface card, such as an Ethernet card, an optical transceiver, a radio frequency transceiver, or any other type of device that can send and receive information. For example, communication unit 106 can be a radio frequency transmitter dedicated to Bluetooth or WiFi bands or commercial networks such as GSM, UMTS, 3G, 4G, 5G, and others. Alternately, communication unit 106 can be a Universal Serial Bus (USB).

Controller 100 can include an input device, such as a presence-sensitive and/or touch-sensitive display, or other type of device configured to receive input from a user. Controller 100 can include an output device, such as a display device, a speaker, a liquid crystal display (LCD), a light emitting diode (LED) display, an organic light emitting diode (OLED) display, discrete switched outputs, or other type of device for outputting information in a form understandable to users or machines.

Controller 100 can be configured to receive and measure input data from detectors within optical sensor 10. For example, controller 100 can be configured to receive the first detector signal from first detector 14, and thereby measure a first intensity of light received by first detector 14. Controller 100 can also be configured to receive the second detector signal from second detector 16, and thereby measure a second intensity of light received by second detector 16. Controller 100 can be further configured to compare measurements to one or more threshold values. Controller 100 can be further configured to use measurement comparisons to determine if a cloud is present. For example, controller 100 can be configured to determine that a cloud is present if either the first intensity or the second intensity exceeds one of the threshold value(s). In this way, controller 100 can determine whether a cloud is present using at least one of the first detector signal and second detector signal. Controller 100 can be configured to discriminate between cloud phases if a cloud is detected in the vicinity of the aircraft.

If a cloud is detected, controller 100 can be configured to estimate a density of the cloud. For example, controller 100 can be configured to use a detection volume and a backscatter intensity (determined by the first intensity and/or the second intensity) to estimate the density of the cloud. The detection volume can be formed by the overlap of illumination volume V and either first detector field of view $\gamma_1$ or second detector field of view $\gamma_2$. Controller 100 can use the detection volume and the first intensity and/or second intensity to estimate if the cloud's density is low, moderate, or high. In this way, controller 100 can enable optical sensor 10 to estimate cloud density without the use of short pulse lasers and high speed resolution.

Figure 3:
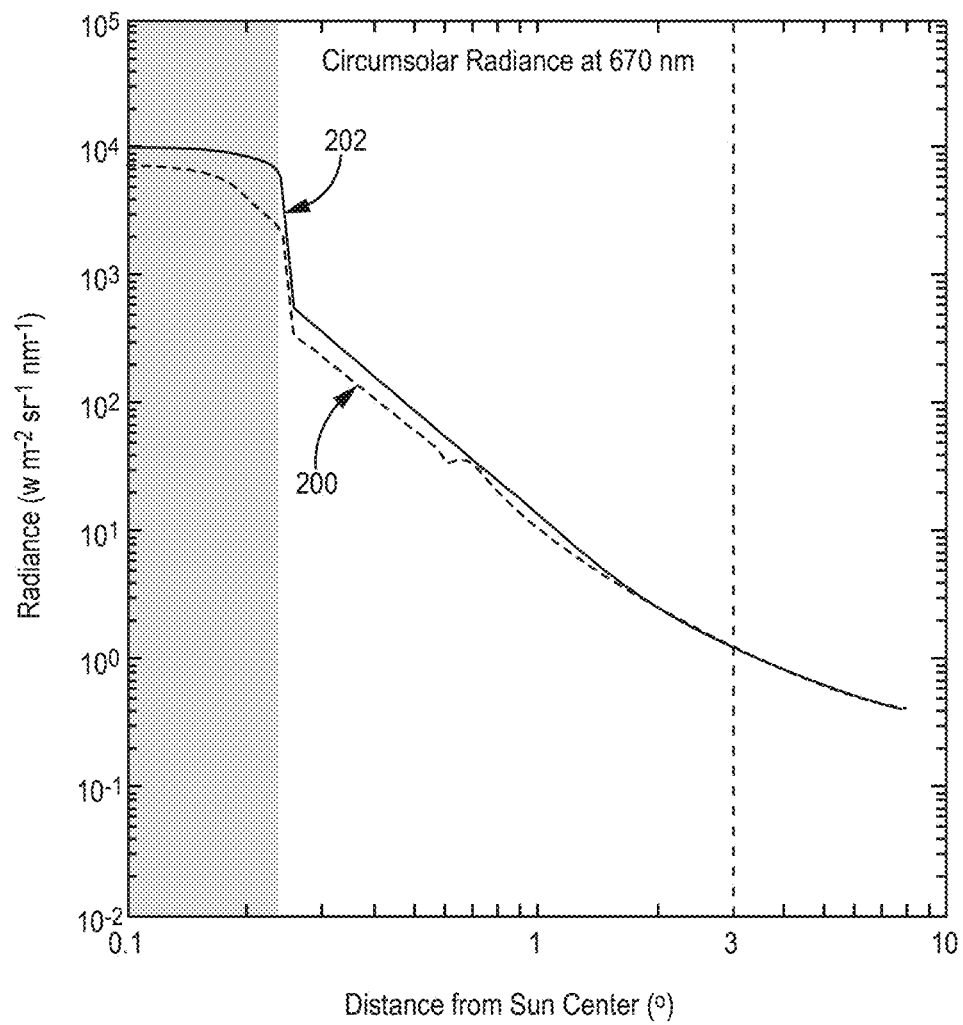
FIG. 3 is a graph of the radiance of the solar aureole scattered by two densities of cirrus clouds for a range of tilt angles.

FIG. 3 is a logarithmic graph of the radiance of the solar aureole scattered by two densities of cirrus clouds for a range of tilt angles (original source: Christian A. Gueymard, *Spectral Circumsolar Radiation Contribution to CPV*, ResearchGate, FIG. 2 (April 2010), https://www.researchgate.net/publication/234909926_Spectral_Circumsolar_Radiation_Contribu tion_To_CPV). The x-axis represents the distance, in degrees, from the sun center within a detector's field of view. The y-axis represents the radiance in watts per square meter ($W·m^2$). FIG. 3 displays cirrus trend line 200 and very thin cirrus trend line 202.

FIG. 3 illustrates the radiance of sunlight (scattered by either typical cirrus clouds or very thin cirrus clouds) as the angle from the sun increases. Cirrus trend line 200 and very thin cirrus trend line 202 exhibit similar behavior from approximately 0.3 degrees to approximately 8 degrees, generally decreasing in radiance from approximately 400 $W·m^{-2}$ to approximately 0.3 $W·m^2$. At 3 degrees from the sun center, the solar radiance along both cirrus trend line 200 and very thin cirrus trend line 202 is approximately 1 $W·m^{-2}$.

The sun subtends approximately 0.5 degrees in the sky, meaning that a direct solar viewing can occur within a 0.5 degree span in a detector's field of view. The presence of aerosols or clouds (such as cirrus clouds or very thin cirrus clouds) can scatter sunlight over more of the detector's field of view than 0.5 degrees. However, as shown in FIG. 3, this scattered sunlight quickly decreases in radiance as the angle from the sun increases.

Figure 4:
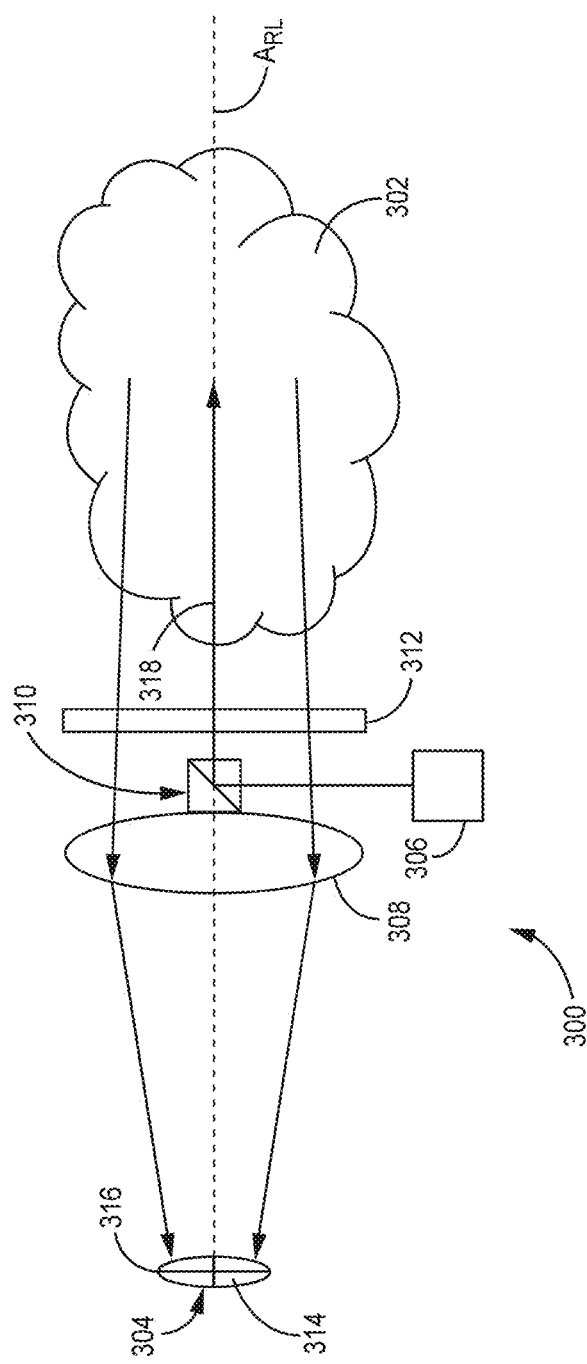
FIG. 4 is a schematic depiction of an optical sensor.
Figure 5:
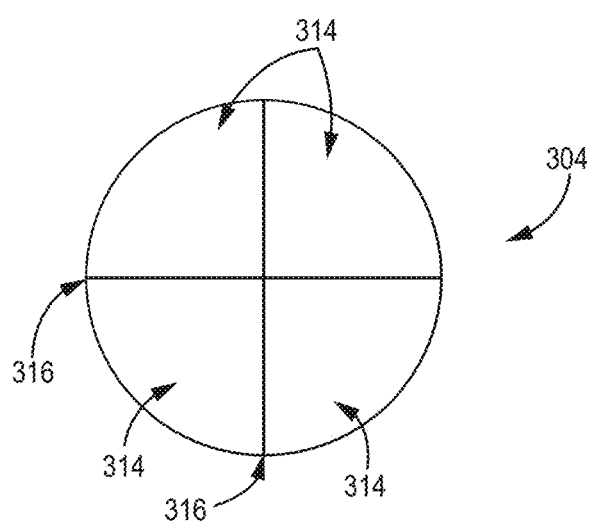
FIG. 5 is a front perspective view of a quad detector photodiode.

FIG. 4 is a schematic depiction of optical sensor 300 and cloud 302. Optical sensor 300 includes quad detector photodiode 304, source 306, receiver lens 308, polarizing beam splitter 310, and quarter-wave plate 312. Quad detector photodiode 304 includes four detectors 314 and interstitial gaps 316. Beam 318 (emitted from source 306) is also shown in FIG. 4. Optical sensor 300 can additionally include a controller, such as controller 100 (shown in FIG. 2), and a detector mask, such as detector masks 400, 410, 418 (described below in reference to FIGS. 6A-6C). FIG. 5 is a front perspective view of quad detector photodiode 304. FIGS. 4-5 will be discussed together.

Quad detector photodiode 304 is a photodiode substrate which has been separated into four detectors 314, and which is several millimeters wide. Each detector 314 is an optical detector which is independent of the other detectors 314. Each detector 314 makes up approximately one quarter of the surface of quad detector photodiode 304. In the same manner as first detector 14 and second detector 16 (described above in reference to FIG. 1), each detector 314 has a field of view. Each detector 314 is opposite another detector 314 across the center of quad detector photodiode 304, such that two detectors 314 which are not next to each other within quad detector 314 form an opposite pair. Interstitial gaps 316 separate each detector 314 from the other detectors 314 in quad detector photodiode 304. The interstitial gaps 316 may be any dimension suitable to define multiple individual detectors 314. In some examples, each interstitial gap 316 is approximately 0.1 millimeters wide, and each detector 314 is thereby separated by approximately 0.1 mm from the other detectors 314 to either side. Source 306 is a light source, and in the depicted example is an intensity-modulated laser source which emits beam 318 during operation.

Receiver lens 308 is oriented along receiver lens axis $A_{RL}$. Quad detector photodiode 304 and polarizing beam splitter 310 are located along receiver lens axis $A_{RL}$ such that receiver lens 308 receives and focuses light along receiver lens axis $A_{RL}$ and onto quad detector photodiode 304 during operation. After source 306 emits beam 318, quarter-wave plate 312 can circularly polarize beam 318, and beam 318 is projected such that beam 318 is colinear to receiver lens axis $A_{RL}$.

Optical sensor 300 is configured to discriminate between cloud phases (whether the cloud contains water droplets or ice crystals) by measuring the depolarization of the backscatter of beam 318. Along the axis of a laser such as beam 318, water droplets preserve the polarization of laser light, while ice crystals depolarize the laser light. The further off-axis the backscatter (generally, more than 0.5 degrees), the more likely that the backscatter can be depolarized by water droplets in a similar manner to ice crystals, making cloud phase discrimination using depolarization measurements less accurate.

Figure 6A:
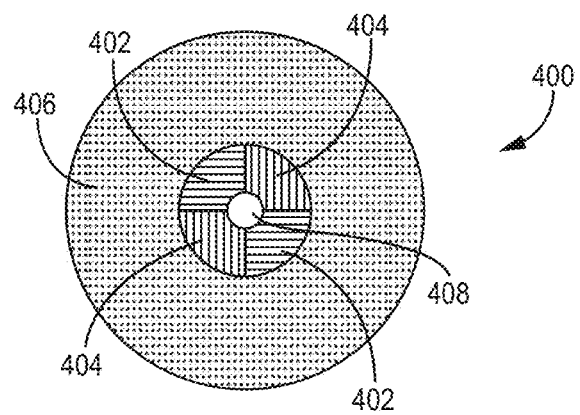
FIG. 6A is a schematic depiction of a first embodiment of a quad detector photodiode masked by linear polarizers and a central obscuration.

FIG. 6A is a schematic depiction of detector mask 400. Detector mask 400 includes horizontal linear polarizers 402, vertical linear polarizers 404, circumferential opaque region 406, and central obscuration 408.

Detector mask 400 can be a glass plate with metal-plated regions (such as, for example, chromium or nickel plating). Horizontal linear polarizers 402 and vertical linear polarizers 404 linearly polarize incoming light, which can then be sensed by detectors 314. A first horizontal linear polarizer 402 can polarize light in a first horizontal polarization direction, and a second horizontal linear polarizer 402 can polarize light in a second horizontal polarization direction which is parallel to the first horizontal polarization direction. Similarly, a first vertical linear polarizer 404 can polarize light in a first vertical polarization direction, and a second vertical linear polarizer 404 can polarize light in a second vertical polarization direction which is parallel to the first vertical polarization direction. The first and second horizontal polarization directions can be perpendicular to the first and second vertical polarization directions. It should be understood that, while the terms "horizontal" and "vertical"

are used herein to describe polarization directions, any polarization directions which are perpendicular are sufficient, as other sources reference "s" and "p" polarization state. Circumferential opaque region 406 and central obscuration 408 serve to occlude portions of the detector. Circumferential opaque region 406 extends along at least a portion of the circumference of detector mask 400, and extends along the entirety of the circumference of detector mask 400 in the example depicted in FIG. 6A. Circumferential opaque region 406 obscures light which is too far off-axis for detectors 314 to perform polarimetric cloud phase discrimination accurately, and thereby selectively allows light which is sufficiently close to the axis of the laser to return to detectors 314. When detector mask 400 is located adjacent to quad detector photodiode 304 (described above in reference to FIGS. 4-5), central obscuration 408 obscures 0.5 degrees within the field of view of each opposite pair of detectors 314. As described above, this 0.5 degree obscuration prevents both detectors 314 in an opposite pair from viewing the sun simultaneously.

Horizontal linear polarizers 402 each linearly polarize a horizontal component of beam 318 after it has been circularly polarized by quarter-wave plate 312 reflected from cloud 302, and focused by receiver lens 308. Similarly, vertical linear polarizers 404 each linearly polarize a vertical component of beam 318 after it has been circularly polarized by quarter-wave plate 312, reflected from cloud 302, and focused by receiver lens 308.

Detector mask 400 can be used to selectively polarize and obscure light before it enters a quad detector photodiode, such as quad detector photodiode 304. The design of detector mask 400 is selected to allow quad detector photodiode 304 to detect the presence of cloud while reducing interference from ambient light. As described above in reference to FIG. 3, this ambient light can be either direct sunlight or a bright solar aureole caused by clouds.

Figure 6B:
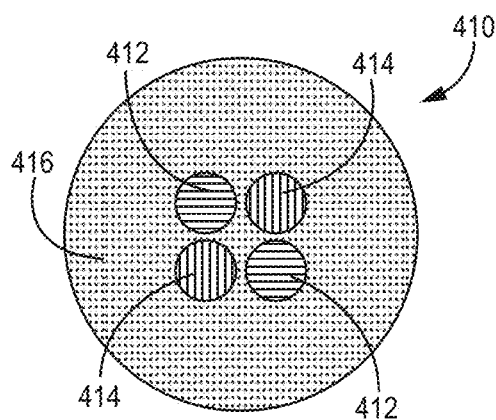
FIG. 6B is a schematic depiction of a second embodiment of a quad detector photodiode masked by linear polarizers and a circumferential opaque region.

FIG. 6B is a schematic depiction of detector mask 410. Detector mask 410 includes horizontal linear polarizers 412, vertical linear polarizers 414, and opaque region 416.

In a similar manner to detector mask 400 (described above in reference to FIG. 6A), detector mask 410 can be used to selectively polarize and obscure light before it enters a quad detector photodiode, such as quad detector photodiode 304. Horizontal linear polarizers 412 function in substantially the same way as horizontal linear polarizers 402 (described above in reference to FIG. 6A), and vertical linear polarizers 414 function in substantially the same way as vertical linear polarizers 404 (described above in reference to FIG. 6A). Opaque region 416 obscures the outermost region of a quad detector photodiode's field of view in the same manner as circumferential opaque region 406 (described above in reference to FIG. 6A). Additionally, opaque region 416 obscures the central 0.5 degrees of the quad detector photodiode's field of view in the same manner as central obscuration 408 (described above in reference to FIG. 6A).

Figure 6C:
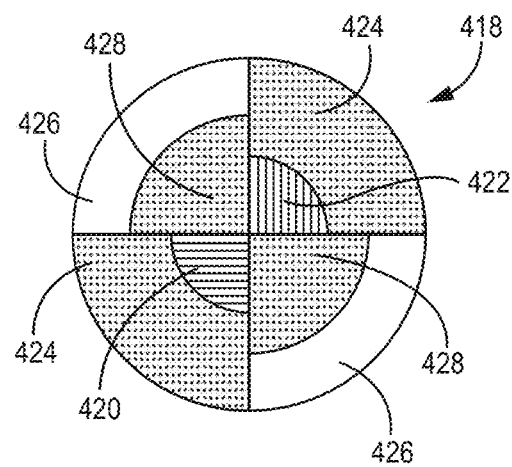
FIG. 6C is a schematic depiction of a third embodiment of a quad detector photodiode masked by linear polarizers and central opaque regions.

FIG. 6C is a schematic depiction of detector mask 418. Detector mask 418 includes horizontal linear polarizer 420, vertical linear polarizer 422, circumferential opaque regions 424, cloud detector regions 426, and central opaque regions 428.

Horizontal linear polarizer 420 functions in substantially the same way as horizontal linear polarizers 402 (described above in reference to FIG. 6A), and vertical linear polarizer 422 functions in substantially the same way as vertical linear polarizers 404 (described above in reference to FIG. 6A). Circumferential opaque regions 424 obscure the outermost region of a quad detector photodiode's field of view in the same manner as circumferential opaque region 406 (described above in reference to FIG. 6A). This obscuration prevents the two detectors 314 adjacent to either horizontal linear polarizer 420 or vertical linear polarizer 422 from receiving polarized light too far off-axis.

Central opaque regions 428 obscure a larger central portion of detectors 314 than, for example, central obscuration 408 (described above in reference to FIG. 6A) or opaque region 416 (described above in reference to FIG. 6B). Cloud detector regions 426 and central opaque regions 428 allow the two detectors 314 adjacent to cloud detector regions 426 to receive light which is further off-axis. As described above, this light does not allow for the polarimetric discrimination of cloud phases, but can still be used to detect the presence of clouds. This allows quad detector photodiode 304 to detect clouds even if sunlight (direct or indirect) interferes with the two detectors 314 which are adjacent to horizontal linear polarizer 420 or vertical linear polarizer 422.

Detector mask 418 can be used to selectively polarize and obscure light before it enters a quad detector photodiode, such as quad detector photodiode 304. Detector mask 418 can be used in circumstances where solar aureole interference (beyond the 0.5 degrees of direct solar viewing) is expected. No central obscuration is used due to the fact that a 0.5 degree obscuration will likely be insufficient to limit interference.

An optical sensor as described herein provides numerous advantages. The use of multiple detectors reduces the risk of simultaneous solar interference. Additionally, selectively polarizing and obscuring light can allow an optical sensor to retain cloud phase discrimination and/or cloud detection. Finally, the optical sensors described above allow for the use of lower-cost lasers and photodetectors than conventional methods. These components do not require extremely sensitive electronics, and lower-speed digital electronics can be used to receive and measure input signal data.

Discussion of Possible Embodiments

The following are non-exclusive descriptions of possible embodiments of the present invention.

An embodiment of an optical sensor for an aircraft includes a first detector, a second detector, a light source, and a controller. The first detector is oriented along a first detector path and has a first tilt angle and a first detector field of view. The first detector is configured to detect light reflected from an illumination volume and to generate a first detector signal that corresponds to a first intensity of detected light. The second detector is oriented along a second detector path and has a second tilt angle and a second detector field of view. The second tilt angle is equal to the first tilt angle such that the second detector is oriented in an opposite direction as the first detector within a plane containing a light source path, the first detector path, and the second detector path. The second detector is configured to detect light reflected from an illumination volume and to generate a second detector signal that corresponds to a second intensity of detected light. The light source is oriented along the light source path. The light source is configured to illuminate the illumination volume which overlaps with both the first detector field of view and the second detector field of view within a predetermined distance range. The predetermined distance range extends between a maximum distance from the first detector and the second detector and a minimum distance from the first detector and the second detector. The controller is configured to receive the first detector signal and the second detector signal. The controller is further configured to detect whether a cloud is present based upon the first detector signal and the second detector signal. The controller is further configured to determine, if a cloud is detected, a cloud phase of the cloud. The controller is further configured to estimate, if a cloud is detected, a density of the cloud.

The optical sensor of the preceding paragraph can optionally include, additionally and/or alternatively, any one or more of the following features, configurations and/or additional components:

An optical sensor for an aircraft according to an exemplary embodiment of this disclosure, among other possible things includes a first detector, a second detector, a light source, and a controller. The first detector is oriented along a first detector path and has a first tilt angle and a first detector field of view. The first detector is configured to detect light reflected from an illumination volume and to generate a first detector signal that corresponds to a first intensity of detected light. The second detector is oriented along a second detector path and has a second tilt angle and a second detector field of view. The second tilt angle is equal to the first tilt angle such that the second detector is oriented in an opposite direction as the first detector within a plane containing a light source path, the first detector path, and the second detector path. The second detector is configured to detect light reflected from an illumination volume and to generate a second detector signal that corresponds to a second intensity of detected light. The light source is oriented along the light source path. The light source is configured to illuminate the illumination volume which overlaps with both the first detector field of view and the second detector field of view within a predetermined distance range. The predetermined distance range extends between a maximum distance from the first detector and the second detector and a minimum distance from the first detector and the second detector. The controller is configured to receive the first detector signal and the second detector signal. The controller is further configured to detect whether a cloud is present based upon the first detector signal and the second detector signal. The controller is further configured to determine, if a cloud is detected, a cloud phase of the cloud. The controller is further configured to estimate, if a cloud is detected, a density of the cloud.

A further embodiment of the foregoing optical sensor, further comprising a receiver lens and a polarizing beam splitter. The light source is configured to emit an intensity-modulated laser beam.

A further embodiment of any of the foregoing optical sensors, wherein the first detector and the second detector are components of a quad detector photodiode, and the quad detector photodiode comprises four detectors.

A further embodiment of any of the foregoing optical sensors, further comprising a quarter-wave plate which is configured to circularly polarize the intensity-modulated laser beam.

A further embodiment of any of the foregoing optical sensors, further comprising a detector mask which is located adjacent to the quad detector photodiode and is configured to selectively obscure both direct sunlight and scattered sunlight.

A further embodiment of any of the foregoing optical sensors, wherein the detector mask comprises a first linear polarizer configured to polarize light in a first polarization direction and a second linear polarizer configured to polarize light in a second polarization direction. The second polarization direction is perpendicular to the first polarization direction.

A further embodiment of any of the foregoing optical sensors, wherein the detector mask comprises a first vertical linear polarizer, a second vertical linear polarizer, a first horizontal linear polarizer, and a second horizontal linear polarizer. The first vertical linear polarizer is configured to polarize light in a first vertical polarization direction. The second vertical linear polarizer is configured to polarize light in a second vertical polarization direction which is parallel to the first vertical polarization direction. The first horizontal linear polarizer is configured to polarize light in a first horizontal polarization direction. The second horizontal linear polarizer is configured to polarize light in a second horizontal polarization direction which is parallel to the first horizontal polarization direction. The first vertical polarization direction is perpendicular to the first horizontal polarization direction. The first horizontal linear polarizer and the second horizontal linear polarizer are arranged alternatingly between the first vertical linear polarizer and the second vertical linear polarizer such that each of the first horizontal linear polarizer, the second horizontal linear polarizer, the first vertical linear polarizer, and the second vertical linear polarizer are adjacent to a detector within the quad detector photodiode.

A further embodiment of any of the foregoing optical sensors, wherein the detector mask comprises a central obscuration which is configured to obscure a viewing angle of 0.5 degrees.

A further embodiment of any of the foregoing optical sensors, wherein the detector mask comprises at least one circumferential opaque region which extends along at least a portion of a circumference of the detector mask.

A further embodiment of any of the foregoing optical sensors, wherein the detector mask comprises a first central opaque region, a second central opaque region, a first linear polarizer, and a second linear polarizer. The first central opaque section and the second central opaque section are arranged alternatingly between the first linear polarizer and the second linear polarizer such that each of the first central opaque section, the second central opaque section, the first linear polarizer, and the second linear polarizer are adjacent to a detector within the quad detector photodiode.

A further embodiment of any of the foregoing optical sensors, further comprising a receiver lens, a polarizing beam splitter, a quarter-wave plate, and a detector mask. The quarter-wave plate is configured to circularly polarize a modulated laser beam. The detector mask is located adjacent to a quad detector photodiode and is configured to selectively obscure both direct sunlight and scattered sunlight. The detector mask comprises a first linear polarizer configured to polarize light in a first polarization direction, and a second linear polarizer configured to polarize light in a second polarization direction. The second polarization direction is perpendicular to the first polarization direction. The light source is configured to emit the intensity-modulated laser beam. The first detector and the second detector are components of the quad detector photodiode.

An embodiment of a method of operating an optical sensor for an aircraft includes emitting, with a light source oriented along a light source path, a light beam with a wavelength and thereby illuminating an illumination volume. A first detector receives light having the wavelength and thereby generates a first detector signal that corresponds to a first intensity of detected light. The first detector is oriented along a first detector path and has a first tilt angle and a first detector field of view. A second detector receives light having the wavelength and thereby generating a second detector signal that corresponds to a second intensity of detected light. The second detector is oriented along a second detector path and has a second tilt angle and a second detector field of view. The second tilt angle is equal to the first tilt angle such that the second detector is oriented in an opposite direction as the first detector within a plane containing the light source path, the first detector path, and the second detector path. A controller receives the first detector signal and the second detector signal. The controller detects whether a cloud is present using at least one of the first detector signal and the second detector signal. The controller determines a cloud phase of the cloud if a cloud is detected. The controller calculates a density of the cloud if a cloud is detected. The light source is configured to illuminate an illumination volume which overlaps with both the first detector field of view and the second detector field of view within a predetermined distance range. The predetermined distance range extends between a maximum distance from the first detector and the second detector and a minimum distance from the first detector and the second detector.

The method of the preceding paragraph can optionally include, additionally and/or alternatively, any one or more of the following features, configurations and/or additional components:

A method of operating an optical sensor for an aircraft according to an exemplary embodiment of this disclosure, among other possible things includes emitting, with a light source oriented along a light source path, a light beam with a wavelength and thereby illuminating an illumination volume. A first detector receives light having the wavelength and thereby generates a first detector signal that corresponds to a first intensity of detected light. The first detector is oriented along a first detector path and has a first tilt angle and a first detector field of view. A second detector receives light having the wavelength and thereby generating a second detector signal that corresponds to a second intensity of detected light. The second detector is oriented along a second detector path and has a second tilt angle and a second detector field of view. The second tilt angle is equal to the first tilt angle such that the second detector is oriented in an opposite direction as the first detector within a plane containing the light source path, the first detector path, and the second detector path. A controller receives the first detector signal and the second detector signal. The controller detects whether a cloud is present using at least one of the first detector signal and the second detector signal. The controller determines a cloud phase of the cloud if a cloud is detected. The controller calculates a density of the cloud if a cloud is detected. The light source is configured to illuminate an illumination volume which overlaps with both the first detector field of view and the second detector field of view within a predetermined distance range. The predetermined distance range extends between a maximum distance from the first detector and the second detector and a minimum distance from the first detector and the second detector.

A further embodiment of the foregoing method, wherein the first detector and the second detector are components of a quad detector photodiode.

A further embodiment of any of the foregoing methods, wherein the light beam is an intensity-modulated laser beam.

A further embodiment of any of the foregoing methods, further comprising circularly polarizing, with a quarter-wave plate, the modulated laser beam.

A further embodiment of any of the foregoing methods, further comprising masking, with a detector mask located adjacent to the quad detector photodiode, the quad detector photodiode and thereby selectively obscuring both direct sunlight and scattered sunlight.

A further embodiment of any of the foregoing methods, wherein the first detector and the second detector are components of a quad detector photodiode and the light beam is an intensity-modulated laser beam, and further comprising circularly polarizing, with a quarter-wave plate, the intensity-modulated laser beam, and masking, with a detector mask located adjacent to the quad detector photodiode, the quad detector photodiode and thereby selectively obscuring both direct sunlight and scattered sunlight. Masking the quad detector photodiode comprises polarizing, with a first linear polarizer, light in a first polarization direction, and polarizing, with a second linear polarizer, light in a second polarization direction which is perpendicular to the first polarization direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An optical sensor for an aircraft, the optical sensor comprising:
   a receiver lens;
   a polarizing beam splitter;
   a quad detector photodiode comprising four detectors, the four detectors comprising:
      a first detector oriented along a first detector path having a first tilt angle measured on an axis oriented perpendicular to a face on the first detector and a first detector field of view, wherein the first detector is configured to detect light reflected from an illumination volume and to generate a first detector signal that corresponds to a first intensity of detected light;
      a second detector oriented along a second detector path having a second tilt angle measured on an axis oriented perpendicular to a face on the first detector and a second detector field of view, wherein the second tilt angle is equal to the first tilt angle such that the second detector is oriented in an opposite direction as the first detector within a plane containing a light source path, the first detector path, and the second detector path, wherein the second detector is configured to detect light reflected from an illumination volume and to generate a second detector signal that corresponds to a second intensity of detected light;
   a detector mask located adjacent to the quad detector photodiode and configured to selectively obscure both direct sunlight and scattered sunlight;
   a light source oriented along the light source path, wherein the light source is configured to illuminate the illumination volume which overlaps with both the first detector field of view and the second detector field of view within a predetermined distance range, wherein the predetermined distance range extends between a maximum distance from the first detector and the second detector and a minimum distance from the first detector and the second detector, wherein the light source is configured to emit an intensity-modulated laser beam; and
a controller, wherein the controller is configured to:
receive the first detector signal and the second detector signal;
detect whether a cloud is present based upon the first detector signal and the second detector signal;
determine, if a cloud is detected, a cloud phase of the cloud; and
calculate, if a cloud is detected, a density of the cloud.

2. The optical sensor of claim 1, further comprising a quarter-wave plate which is configured to circularly polarize the intensity-modulated laser beam.

3. The optical sensor of claim 1, wherein the detector mask comprises:
a first linear polarizer configured to polarize light in a first polarization direction; and
a second linear polarizer configured to polarize light in a second polarization direction, wherein the second polarization direction is perpendicular to the first polarization direction.

4. The optical sensor of claim 1, wherein the detector mask comprises:
a first vertical linear polarizer configured to polarize light in a first vertical polarization direction;
a second vertical linear polarizer configured to polarize light in a second vertical polarization direction, wherein the second vertical polarization direction is parallel to the first vertical polarization direction;
a first horizontal linear polarizer configured to polarize light in a first horizontal polarization direction; and
a second horizontal linear polarizer configured to polarize light in a second horizontal polarization direction, wherein the second horizontal polarization direction is parallel to the first horizontal polarization direction;
wherein the first vertical polarization direction is perpendicular to the first horizontal polarization direction, and the first horizontal linear polarizer and the second horizontal linear polarizer are arranged alternatingly between the first vertical linear polarizer and the second vertical linear polarizer such that each of the first horizontal linear polarizer, the second horizontal linear polarizer, the first vertical linear polarizer, and the second vertical linear polarizer are adjacent to a detector within the quad detector photodiode.

5. The optical sensor of claim 1, wherein the detector mask comprises a central obscuration which is configured to obscure a viewing angle of 0.5 degrees.

6. The optical sensor of claim 1, wherein the detector mask comprises at least one circumferential opaque region which extends along at least a portion of a circumference of the detector mask.

7. The optical sensor of claim 1, wherein the detector mask comprises:
a first central opaque region;
a second central opaque region;
a first linear polarizer; and
a second linear polarizer;
wherein the first central opaque section and the second central opaque section are arranged alternatingly between the first linear polarizer and the second linear polarizer such that each of the first central opaque section, the second central opaque section, the first linear polarizer, and the second linear polarizer are adjacent to a detector within the quad detector photodiode.

8. The optical sensor of claim 1, wherein the detector mask comprises:
a first linear polarizer configured to polarize light in a first polarization direction; and
a second linear polarizer configured to polarize light in a second polarization direction, wherein the second polarization direction is perpendicular to the first polarization direction;
wherein:
the light source is configured to emit the intensity-modulated laser beam; and
the first detector and the second detector are components of the quad detector photodiode.

9. A method of operating an optical sensor for an aircraft, the method comprising:
emitting, with a light source oriented along a light source path, a light beam with a wavelength and thereby illuminating an illumination volume;
receiving, with a first detector oriented along a first detector path having a first tilt angle measured on an axis oriented perpendicular to a face on the first detector and a first detector field of view, light having the wavelength and thereby generating a first detector signal that corresponds to a first intensity of detected light;
receiving, with a second detector oriented along a second detector path having a second tilt angle measured on an axis oriented perpendicular to a face on the second detector and a second detector field of view, light having the wavelength and thereby generating a second detector signal that corresponds to a second intensity of detected light, wherein the second tilt angle is equal to the first tilt angle such that the second detector is oriented in an opposite direction as the first detector within a plane containing the light source path, the first detector path, and the second detector path, wherein the first detector and the second detector are components of a quad detector photodiode;
receiving, with a controller, the first detector signal and the second detector signal;
detecting, with the controller, whether a cloud is present using at least one of the first detector signal and the second detector signal;
masking, with a detector mask located adjacent to the quad detector photodiode, the quad detector photodiode and thereby selectively obscuring both direct sunlight and scattered sunlight;
determining, with the controller, a cloud phase of the cloud if a cloud is detected; and
calculating, with the controller, a density of the cloud if a cloud is detected;
wherein the light source is configured to illuminate an illumination volume which overlaps with both the first detector field of view and the second detector field of view within a predetermined distance range, and the predetermined distance range extends between a maximum distance from the first detector and the second detector and a minimum distance from the first detector and the second detector.

10. The method of claim 9, wherein the light beam is an intensity-modulated laser beam.

11. The method of claim 10, further comprising circularly polarizing, with a quarter-wave plate, the modulated laser beam.

12. The method of claim 9, wherein:
masking, with a detector mask located adjacent to the quad detector photodiode, the quad detector photodiode and thereby selectively obscuring both direct sunlight and scattered sunlight, wherein masking the quad detector photodiode comprises:

polarizing, with a first linear polarizer, light in a first polarization direction; and polarizing, with a second linear polarizer, light in a second polarization direction which is perpendicular to the first polarization direction.

* * * * *